(12) United States Patent
Watanabe (10) Patent No.: US 10,026,157 B2
(45) Date of Patent: Jul. 17, 2018

(54) IMAGE PROCESSING APPARATUS, IMAGE PICKUP APPARATUS, IMAGE PROCESSING METHOD, IMAGE PROCESSING PROGRAM, AND STORAGE MEDIUM

(71) Applicant: CANON KABUSHIKI KAISHA, Tokyo (JP)

(72) Inventor: Takeshi Watanabe, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 17 days.

(21) Appl. No.: 15/032,644

(22) PCT Filed: May 21, 2015

(86) PCT No.: PCT/JP2015/002566
§ 371 (c)(1),
(2) Date: Apr. 28, 2016

(87) PCT Pub. No.: WO2016/002126
PCT Pub. Date: Jan. 7, 2016

(65) Prior Publication Data
US 2016/0275656 A1 Sep. 22, 2016

(30) Foreign Application Priority Data
Jul. 4, 2014 (JP) ................. 2014-138487

(51) Int. Cl.
*G06T 5/00* (2006.01)
*H04N 5/232* (2006.01)
*H04N 5/217* (2011.01)

(52) U.S. Cl.
CPC ............ *G06T 5/003* (2013.01); *H04N 5/217* (2013.01); *H04N 5/2171* (2013.01);
(Continued)

(58) Field of Classification Search
CPC .......... G06T 5/003; G06T 2207/10004; G06T 2207/20056; H04N 5/217; H04N 5/2171;
(Continued)

(56) References Cited

U.S. PATENT DOCUMENTS 8,223,244 B2 7/2012 Ono
8,564,693 B2 10/2013 Makii
(Continued)

FOREIGN PATENT DOCUMENTS

JP 2008268869 A 11/2008
JP 2009015828 A 1/2009
(Continued)

OTHER PUBLICATIONS

International Search Report issued in Intl. Appln. No. PCT/JP2015/002566 dated Aug. 18, 2015.
(Continued)

*Primary Examiner* — Mekonnen Dagnew
(74) *Attorney, Agent, or Firm* — Rossi, Kimms & McDowell LLP (57) ABSTRACT

An image processing apparatus 100 includes a data storage unit 101 configured to store information on first optical characteristic data, a data generation unit 102 configured to generate second optical characteristic data based on the first optical characteristic data related to a shot image and defocus characteristic data, and a restoration unit 104 configured to restore the shot image based on the second optical characteristic data.

12 Claims, 7 Drawing Sheets

(52) U.S. Cl.
CPC ....... *H04N 5/2173* (2013.01); *H04N 5/23212* (2013.01); *H04N 5/23229* (2013.01); *G06T 2207/10004* (2013.01); *G06T 2207/20056* (2013.01)

(58) Field of Classification Search
CPC ............. H04N 5/2173; H04N 5/23212; H04N 5/23229
USPC ... 348/207.99, 208.6, 208.14, 208.13, 208.2, 348/208.3, 208.1, 208.5; 396/52–55; 382/255, 294, 263, 264, 312, 313; 310/12.05, 12.06
See application file for complete search history.

(56) References Cited

U.S. PATENT DOCUMENTS

| | | | |
|---|---|---|---|
| 8,730,371 B2 | 5/2014 | Kikuchi | |
| 8,988,539 B1* | 3/2015 | Pascoguin | ............ H04N 5/2355 348/218.1 |
| 2011/0187874 A1* | 8/2011 | Kikuchi | .................. G06T 5/006 348/207.1 |
| 2013/0308018 A1 | 11/2013 | Sasaki | |
| 2016/0089016 A1* | 3/2016 | Shibata | ................ A61B 3/0025 351/206 |
| 2016/0371567 A1* | 12/2016 | Hiasa | ................... G06K 9/6267 |

FOREIGN PATENT DOCUMENTS

| | | | |
|---|---|---|---|
| JP | 2012005056 A | | 1/2012 |
| JP | 2012-005056 | * | 5/2012 |
| JP | 2013240022 A | | 11/2013 |
| WO | 2010067740 A1 | | 6/2010 |

OTHER PUBLICATIONS

Written Opinion issued in Intl. Appln. No. PCT/JP2015/002566 dated Aug. 18, 2015.
Extended European Search Report issued in European Appln. No. 15814958.3 dated Jan. 24, 2018.

* cited by examiner

IMAGE PROCESSING APPARATUS, IMAGE PICKUP APPARATUS, IMAGE PROCESSING METHOD, IMAGE PROCESSING PROGRAM, AND STORAGE MEDIUM

TECHNICAL FIELD

The present invention relates to an image processing apparatus which performs image restoration on a shot image.

BACKGROUND ART

For an object shot via an image pickup optical system, light emitted from one point cannot be converged to another point and has a minute spread due to an influence of a diffraction, an aberration, or the like that occurs in the image pickup optical system. Such a minutely-spread distribution is referred to as a PSF (point spread function). Due to the influence of the image pickup optical system, the shot image is formed with the PSF convolved with the image, and accordingly, the image is blurred and its resolution is deteriorated.

Recently, the shot image is typically stored as electronic data, and image restoration has been proposed which corrects an image deterioration caused by the image pickup optical system by performing image processing. In order to correct the image deterioration caused by the image pickup optical system, it is necessary to obtain accurate OTF information of the image pickup optical system. In reality, however, an object shot by an image pickup apparatus is typically a three-dimensional object with a depth direction instead of a planar object. PTL 1 discloses an optical modulator provided in an image pickup optical system and a method of performing image processing while enlarging a depth of focus. PTL 2 discloses a method of acquiring a distance map of a shot image to perform image processing depending on a distance.

CITATION LIST

Patent Literature

[PTL1] Japanese Patent Laid-open No. 2008-268869
[PTL2] Japanese Patent Laid-open No. 2009-15828

SUMMARY OF INVENTION

Technical Problem

However, in the image processing method disclosed in PTL 1, correction data for each defocus amount are not needed due to enlarging the depth of focus, but both foreground and background are sharpened similarly to each other. In the image processing method disclosed in PTL 2, the method of adding blur depending on a distance is disclosed, but a correction of the blur depending on the distance is not disclosed. Therefore, highly-accurate image restoration considering a small displacement of a focus position originating the depth direction of the object at the time of shooting the image cannot be performed.

The present invention provides an image processing apparatus, an image pickup apparatus, an image processing method, an image processing program, and a storage medium which are capable of correcting a shot image accurately with a small amount of data.

Solution to Problem

An image processing apparatus as one aspect of the present invention includes a data storage unit configured to store information on first optical characteristic data, a data generation unit configured to generate second optical characteristic data based on the first optical characteristic data related to a shot image and defocus characteristic data, and a restoration unit configured to restore the shot image based on the second optical characteristic data.

An image pickup apparatus as another aspect of the present invention includes an image pickup unit configured to photoelectrically convert an optical image formed via an image pickup optical system to output a shot image, a data storage unit configured to store information on first optical characteristic data, a data generation unit configured to generate second optical characteristic data based on the first optical characteristic data related to the shot image and defocus characteristic data, and a restoration unit configured to restore the shot image based on the second optical characteristic data.

An image processing method as another aspect of the present invention includes the steps of generating first optical characteristic data related to a shot image based on information on the first optical characteristic data stored in a data storage unit, generating second optical characteristic data based on the first optical characteristic data related to the shot image and defocus characteristic data, and restoring the shot image based on the second optical characteristic data.

A non-transitory computer-readable storage medium as another aspect of the present invention stores an image processing program which causes a computer to execute a process including the steps of generating first optical characteristic data related to a shot image based on information on the first optical characteristic data stored in a data storage unit, generating second optical characteristic data based on the first optical characteristic data related to the shot image and defocus characteristic data, and restoring the shot image based on the second optical characteristic data.

Further features and aspects of the present invention will become apparent from the following description of exemplary embodiments with reference to the attached drawings.

Advantageous Effects of Invention

According to the present invention, an image processing apparatus, an image pickup apparatus, an image processing method, an image processing program, and a storage medium which are capable of correcting a shot image accurately with a small amount of data can be provided.

DESCRIPTION OF EMBODIMENTS

Exemplary embodiments of the present invention will be described below with reference to the accompanied drawings.

First of all, an outline of an image processing method (image restoration) in this embodiment will be described. The following expression (1) is satisfied where, in a real space (x,y), f(x,y) is an image which is not deteriorated by an optical system, h(x,y) is a PSF (point spread function), and g(x,y) is a deteriorated image.

$$g(x,y)=\iint f(X,Y)*h(x-X,y-Y)dXdY \quad (1)$$

When the Fourier transform is performed for expression (1) to convert the real space (x,y) to a frequency space (u,v), the following expression (2) is satisfied.

$$G(u,v)=F(u,v)*H(u,v) \quad (2)$$

In expression (2), F(u,v), G(u,v), and H(u,v) are results of the Fourier transform of f(x,y), g(x,y), and h(x,y), respectively. Therefore, the following expression (3) is satisfied.

$$F(u,v)=G(u,v)/H(u,v) \quad (3)$$

Expression (3) means that the result F(u,v) of the Fourier transform of the image f(x,y) which is not deteriorated can be obtained by dividing the result G(u,v) of the Fourier transform of the deteriorated image g(x,y) in the frequency space by the result H(u,v) of the Fourier transform of the point spread function h(x,y). Therefore, the image f(x,y) which is not deteriorated can be obtained by performing the inverse Fourier transform for F(u,v).

Actually, however, if such processing is performed to obtain the image which is not deteriorated, a noise caused by an image pickup element is amplified and thus it is difficult to obtain an appropriate.

As a method of restoring an image to suppress the amplification of the noise, using the Wiener filter W(u,v) represented by the following expression (4) is known.

$$W(u,v)=1/H(u,v)*|H(u,v)|^2/(|H(u,v)|^2+\Gamma) \quad (4)$$

In expression (4), symbol H(u,v) denotes an optical transfer function (OTF), and symbol Γ denotes a constant to reduce an amount of the amplification of the noise.

Multiplying W(u,v) represented by expression (4) by the result G(u,v) of the Fourier transform of the deteriorated image g(x,y), a phase component of the PSF caused due to the diffraction or the aberration that occurs in the optical system becomes zero and frequency characteristics of an amplitude component are amplified to be able to obtain a high-resolution and appropriate image. In order to use expression (4) effectively, it is necessary to obtain accurate OTF information of the image pickup optical system. For example, the OTF information can be calculated based on design value information of the image pickup optical system if it is known. Alternatively, the OTF information can be calculated by the Fourier transform of an intensity distribution obtained by shooting an image of a point light source.

Typically, an object which is actually shot by an image pickup apparatus is a three-dimensional object with a depth direction instead of a planar object. With respect to the object, an in-focus position and an out-of-focus position are mixed. In order to perform the image restoration to correct the shot image by using the OTF represented by expression (4), the OTF information need to be known. Therefore, the OTF information are previously stored in the image processing apparatus. For example, in a zoom lens, the OTF information on the combination of all the focal length, the F number, the shooting distance, and the image height are needed. The shooting distance is a distance from the image pickup element to a focused object point. As described above, storing all data (OTF information) in the image pickup apparatus needs an enormous storage capacity and thus it is unrealistic. In order to solve such a problem, this embodiment provides an image processing apparatus, an image pickup apparatus, an image processing method, a program, and a storage medium as specifically described in the following embodiments.

Embodiment 1

Figure 1A:
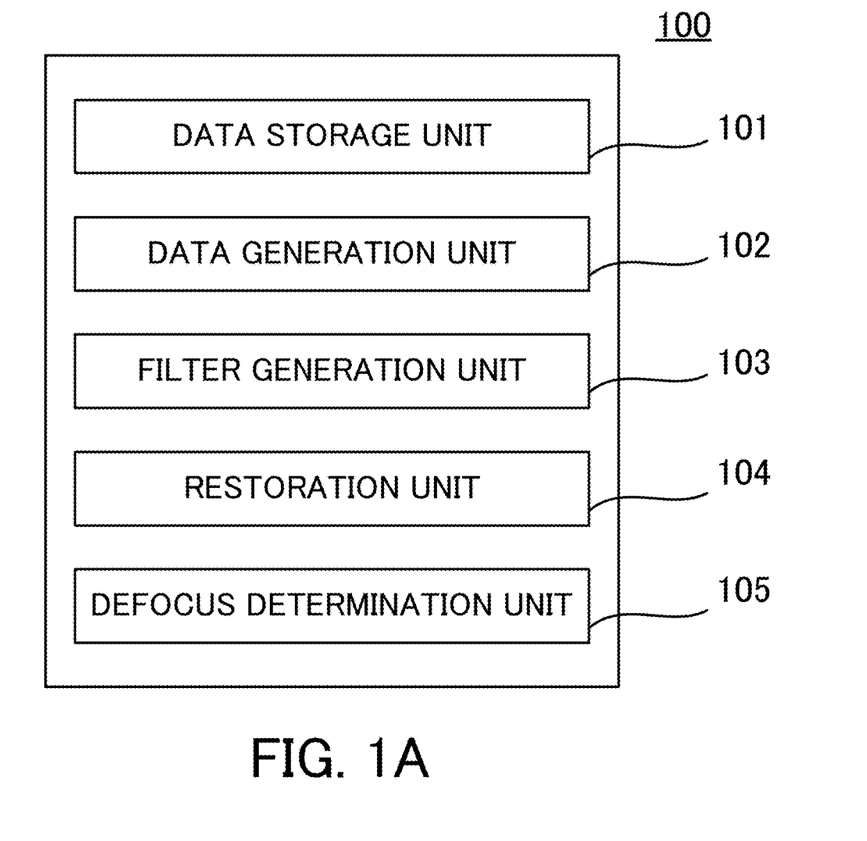
FIG. 1A is a block diagram of an image processing apparatus in Embodiment 1.
Figure 1B:
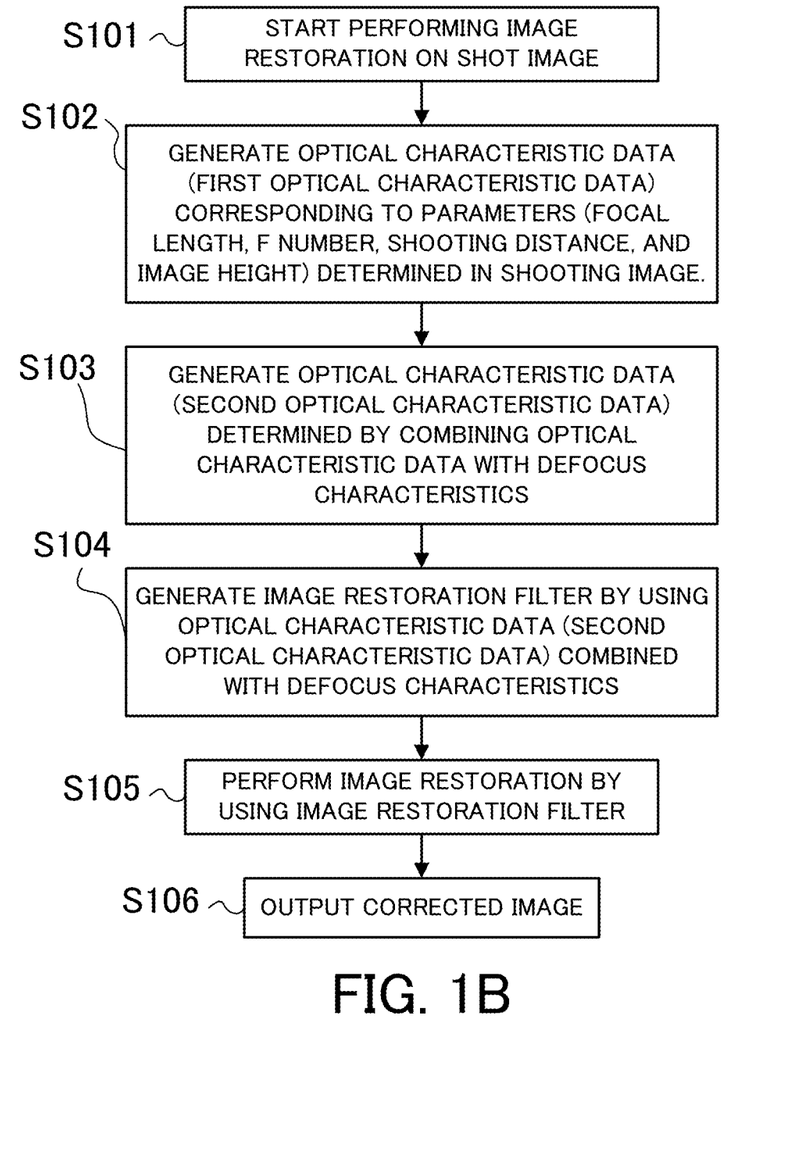
FIG. 1B is a flowchart of an image processing method in Embodiment 1.

First of all, referring to FIGS. 1A and 1B, an image processing apparatus and an image processing method in Embodiment 1 of the present invention will be described. FIG. 1A is a block diagram of an image processing apparatus 100 in this embodiment. FIG. 1B is a flowchart of the image processing method (image restoration) in this embodiment.

As illustrated in FIG. 1A, the image processing apparatus 100 in this embodiment includes a data storage unit 101 (memory), a data generation unit 102 (data generator), a filter generation unit 103 (filter generator), a restoration unit 104 (restoration processor), and a defocus determination unit 105 (defocus determiner). The image processing apparatus 100 is configured to input an object image (shot image) shot by an image pickup apparatus such as a camera. The shot image (image data) is an image deteriorated by the image pickup optical system. Therefore, first at step S101 in FIG. 1B, the image processing apparatus 100 starts image restoration on the shot image.

Subsequently, at step S102, the data generation unit 102 generates optical characteristic data (first optical characteristic data) related to shooting data (shot image data). The shot image data include a shooting condition (shooting condition information) such as a focal length, an F number (aperture value), a shooting distance, and an image height as parameters determined when shooting the image. In this embodiment, the data storage unit 101 (optical characteristic data memory) stores information on optical characteristic data (first optical characteristic data) unique to the image pickup optical system. Therefore, the data generation unit 102 generates the optical characteristic data (first optical characteristic data) corresponding to the shooting condition (focal length, F number, shooting distance, image height, and the like) based on the shot image data and the information on the optical characteristic data stored in the data storage unit 101. If there is no information on the optical characteristic data which correspond to the shooting condition of the shot image, the data generation unit 102 generates the optical characteristic data (first optical characteristic data) to be used for the image restoration based on information on optical characteristic data corresponding to a condition close to the shooting condition. In this embodiment, the optical characteristic data (first optical characteristic data) generated at step S102 are aberration data (wavefront aberration) determined depending on the image pickup optical system and the shooting condition. Preferably, the first optical characteristic data are aberration data on a focal plane (in-focus plane).

Subsequently, at step S103, the data generation unit 102 generates second optical characteristic data based on the first optical characteristic data (optical characteristic data generated at step S102) related to the shot image and defocus characteristic data. More specifically, the data generation unit 102 combines the first optical characteristic data with the defocus characteristic data to generate the second optical characteristic data (optical characteristic data combined with defocus characteristics). The defocus characteristic data are aberration data (wavefront aberration determined depending on a defocus amount.

The defocus determination unit 105 determines the defocus characteristic data. Preferably, the defocus determination unit 105 determines the defocus characteristic data based on a defocus amount of the shot image. More preferably, the defocus determination unit 105 determines the defocus characteristic data based on a defocus amount determined based on a distance map (distance information) of the shot image. In this embodiment, the defocus characteristic data (an amount of defocus characteristics) may be adjusted by a user. In this case, the defocus determination unit 105 determines (changes) the defocus characteristic data based on an instruction of the user.

Subsequently, at step S104, the filter generation unit 103 generates an image restoration filter by using the second optical characteristic data (optical characteristic data combined with the defocus characteristics) generated at step S103. Preferably, the filter generation unit 103 generates the image restoration filter to be applied to the shot image for each image height in the shot image by using the second optical characteristic data.

Subsequently, at step S105, the restoration unit 104 restores the shot image by using the image restoration filter generated at step S104. In other words, the restoration unit 104 restores the shot image based on the second optical characteristic data (optical characteristic data combined with the defocus characteristics) generated at step S103. In the image restoration of this embodiment, for example the Wiener filter is used but the embodiment is not limited thereto. Then, at step S106, the image processing apparatus 100 outputs a restored image (corrected image).

Figure 2A:
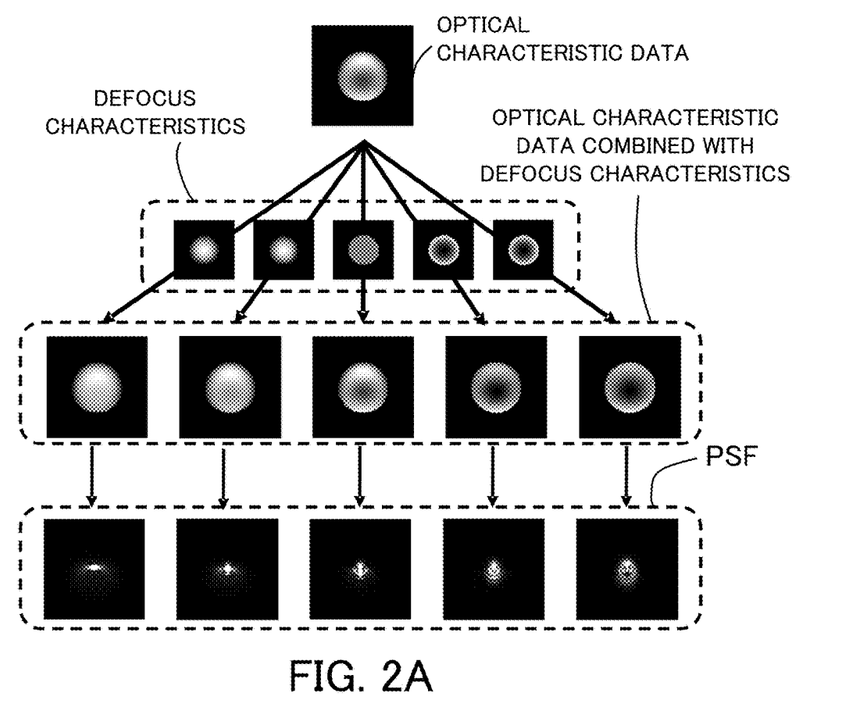
FIG. 2A is a diagram of illustrating an example of first optical characteristic data, defocus characteristic data, second optical characteristic data, and a PSF in Embodiment 1.
Figure 2B:
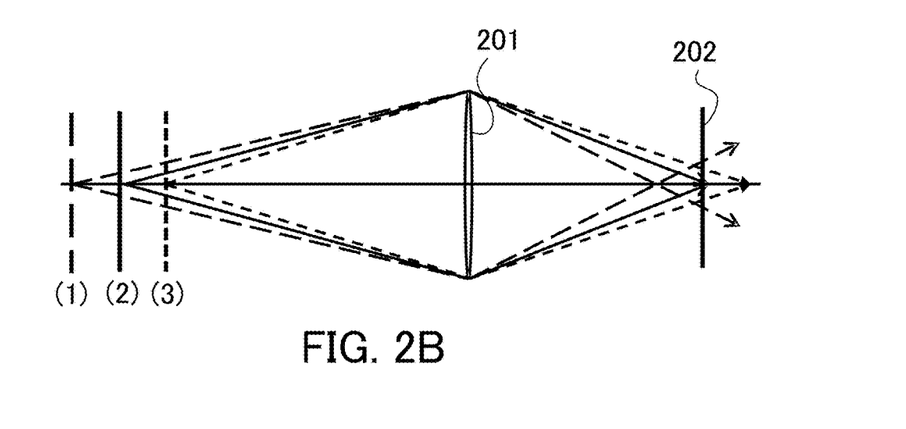
FIG. 2B is a diagram of explaining a focal plane of an image pickup optical system in Embodiment 1.

Next, referring to FIGS. 2A and 2B, the optical characteristic data (first optical characteristic data) of the image pickup optical system, the defocus characteristic data, the optical characteristic data (second optical characteristic data) combined with the defocus characteristics, and the PSF in this embodiment will be described. FIG. 2A is a diagram of illustrating an example of the first optical characteristic data, the defocus characteristic data, the second optical characteristic data, and the PSF. FIG. 2B is a diagram of explaining the focal plane of the image pickup optical system.

The data storage unit 101 (optical characteristic data memory) provided in the image processing apparatus 100 stores wavefront aberration information (information on the first optical characteristic data) which correspond to each image height position in various shooting conditions of the image pickup optical system. The wavefront aberration (aberration data) is different in its profile depending on a center position of a reference spherical surface in calculation. Therefore, in this embodiment, the center position of the reference spherical surface for each image height is calculated as a point on the focal plane of the image pickup optical system indicated as (2) in FIG. 2B. In FIG. 2B, reference numeral 201 denotes an image pickup optical system, and reference numeral 202 denotes an image pickup plane (image pickup element).

The first optical characteristic data (or information on the first optical characteristic data) are the wavefront aberration calculated by the method described above. In this embodiment, for example the user of the image pickup apparatus 100 arbitrarily determines the defocus amount and combines it with the first optical characteristic data to generate the optical characteristic data (second optical characteristic data) combined with the defocus characteristics. The defocus characteristic data in this embodiment are the wavefront aberration (aberration data).

Figure 3A:
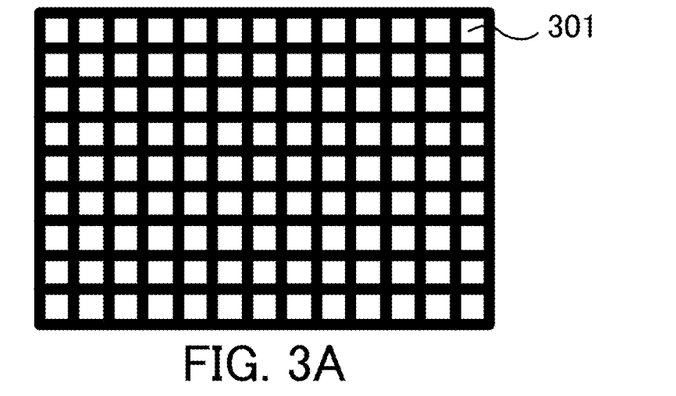
FIG. 3A is a schematic diagram of shot image data in Embodiment 1.
Figure 3B:
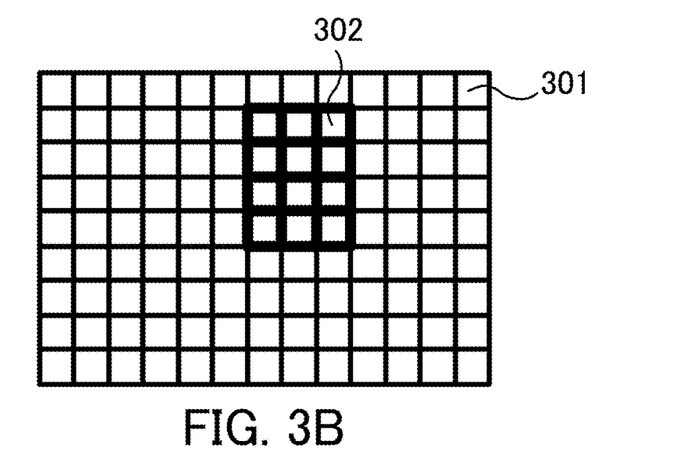
FIG. 3B is a schematic diagram of shot image data in Embodiment 1.
Figure 3C:
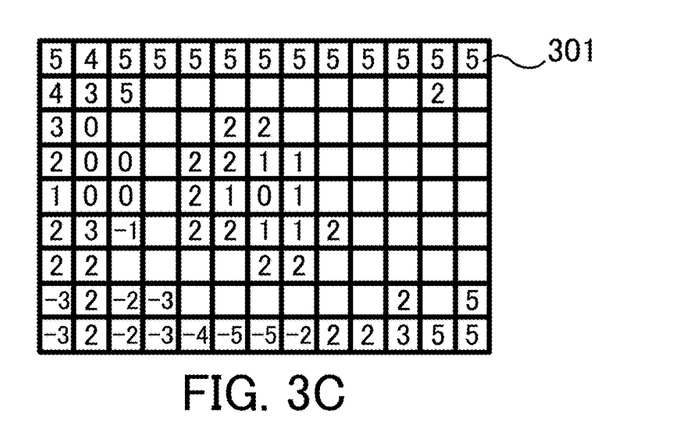
FIG. 3C is a schematic diagram of shot image data in Embodiment 1.

Next, referring to FIGS. 3A to 3C, the defocus characteristics (defocus characteristic data) in this embodiment will be described in detail. FIGS. 3A to 3C are schematic diagrams of the shot image data. FIG. 3A is a diagram of illustrating a process of combining an entire shot image (all pixels) with a uniform amount of defocus characteristics. Each grid 301 in FIGS. 3A to 3C indicates each pixel in the shot image data. For example, the amount of the defocus characteristics given to each pixel can be arbitrarily determined by the user of the image processing apparatus 100.

FIG. 3B is a diagram of illustrating a process of combining part of the shot image with a uniform amount of the defocus characteristics. In the grids 301 of FIG. 3B, grids 302 indicated by heavy lines indicate a region (pixels) to be combined with the defocus characteristics. For example, the amount of the defocus characteristics can be arbitrarily determined by the user of the image processing apparatus 100.

FIG. 3C illustrates a process in which the defocus determination unit 105 of the image processing apparatus 100 acquires distance information of the shot image. In this case, the defocus determination unit 105 automatically determines the defocus amount (defocus characteristics) depending on the distance information of the shot image. Then, the data generation unit 102 of the image processing apparatus 100 generates the defocus characteristics (defocus characteristic data) determined by the defocus determination unit 105 and combines the defocus characteristics with the optical characteristic data (first optical characteristic data). In FIG. 3C, numbers (−5 to +5) inside the grids 301 indicate the distance information with reference to a focal position. The defocus determination unit 105 is capable of generating the defocus characteristics depending on the distance information by calculating the defocus amount based on each piece of the distance information.

If an amount of the deterioration of the object is large and accordingly a large part of information of the optical transfer function (OTF) is lost in the image restoration of this embodiment, an adverse effect of the image deterioration caused by the noise amplification or the generation of ringing is more prominent than an effect obtained by correcting the deterioration of the shot image. Therefore, it is preferred that the optical characteristic data combined with the defocus characteristics are set to be within a range of a wavefront aberration RMS of less than or equal to $0.5\lambda$.

If there is a frequency response of the OTF in a range higher than or equal to half of the Nyquist frequency of the image pickup element in the image restoration of this embodiment, the correction effect prominently appears. Therefore, more preferably, the optical characteristic data combined with the defocus characteristics are set to be within a range of the wavefront aberration RMS of less than or equal to 0.3λ. In other words, it is preferred that the defocus characteristics are combined in a region where the wavefront aberration RMS of a sum of the first optical characteristic data and the defocus characteristic data (i.e. the second optical characteristic data) is within a range less than or equal to 0.5λ, or within a range less than or equal to 0.3λ. When the optical characteristics are good and thus an amount of the aberration is small, an amount of combinable defocus characteristics becomes large.

Figure 4A:
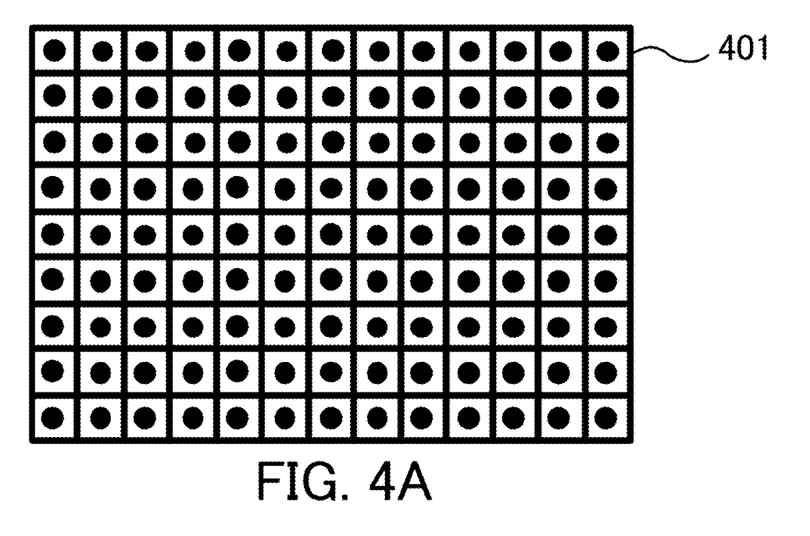
FIG. 4A is a diagram of illustrating an example of information on the first optical characteristic data in Embodiment 1.
Figure 4B:
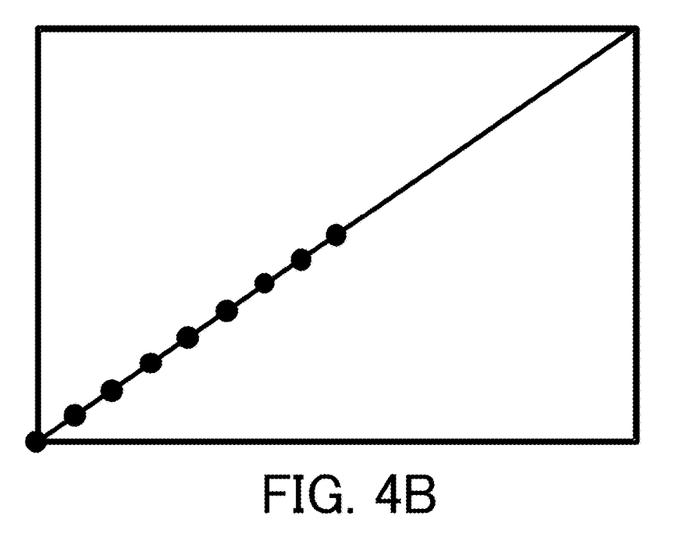
FIG. 4B is a diagram of illustrating an example of information on the first optical characteristic data in Embodiment 1.

Next, referring to FIGS. 4A and 4B, information on the optical characteristic data (first optical characteristic data) stored in the data storage unit 101 of the image processing apparatus 100 will be described. FIGS. 4A and 4B are diagrams of illustrating an example of the information on the optical characteristic data.

The optical characteristic data have characteristics different from each other for each image height in the shot image data with respect to the combination of the focal length of the image pickup optical system, the F number (aperture value), and the shooting distance. Therefore, as illustrated in FIG. 4A, the data storage unit 101 can store the information on the optical characteristic data discretely by dividing an inner region of the shot image data by a plurality of grids 401 with respect to the combination of the focal length, the F number, and the shooting distance.

Alternatively, as illustrated in FIG. 4B, the data storage unit 101 may store information on an optical axis of the image pickup optical system located at the center of the shot image data to the most off-axis point while dividing the information. In this case, optical characteristic data on a coordinate point in an image circle needed to a remaining process is interpolated and generated. In this embodiment, considering specifications of a personal computer (PC) or a memory capacity of the image pickup apparatus, it is preferred that an adequate method is used. In this embodiment, a method other than that illustrated in FIGS. 4A and 4B can also be used.

The image processing apparatus 100 of this embodiment performs the image restoration on the shot image data by using the optical characteristic data combined with the defocus characteristics. Thus, the shot image data can be corrected (i.e. image restoration can be performed) with high accuracy. According to this embodiment, the optical characteristic data do not have to be previously stored for each defocus position, and thus a necessary storage capacity can be reduced to a data amount around a few megabytes to tens of megabytes.

Figure 5:
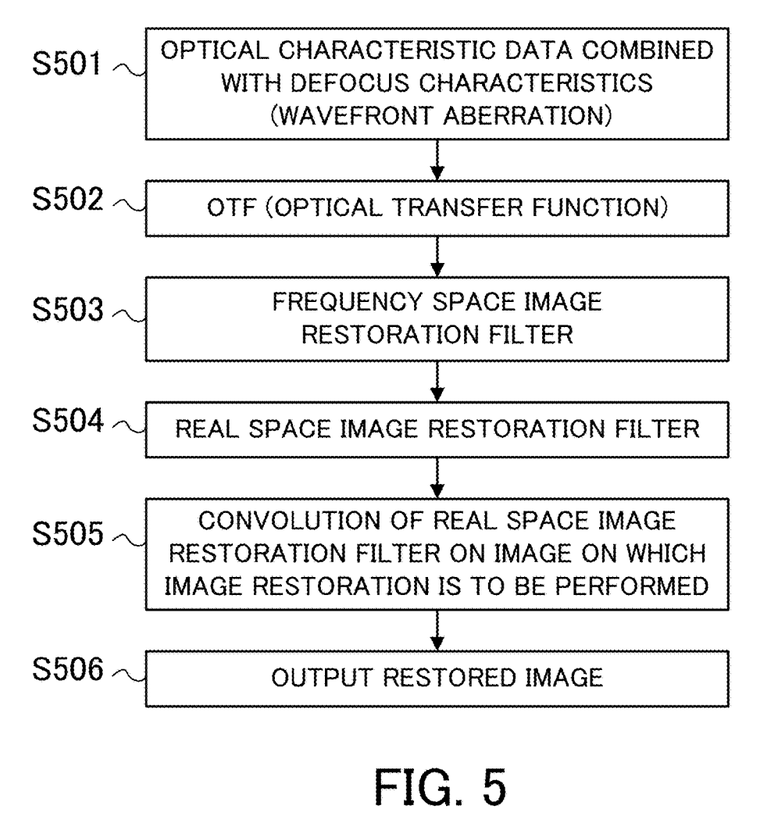
FIG. 5 is a flowchart of image restoration in Embodiment 1.

Next, referring to FIG. 5, a specific procedure of the image restoration in this embodiment will be described. FIG. 5 is a flowchart of the image restoration. FIG. 5 illustrates a procedure from the generation of the optical characteristic data combined with the defocus characteristics to the correction and output of the shot image according to the image restoration, and it corresponds to steps S103 to S106 in FIG. 1.

First, at step S501, the data generation unit 102 generates the optical characteristic data combined with the defocus characteristics (i.e. second optical characteristic data $W(\xi, \eta)$). Subsequently, at step S502, the data generation unit 102 acquires a pupil function $G(\xi,\eta)=\exp(i**W(\xi,\eta))$ for the second optical characteristic data $W(\xi,\eta)$. Then, the image processing apparatus 100 (data generation unit 102 or filter generation unit 103) calculates autocorrelation of the pupil function $G(\xi,\eta)$ within a range of $\xi^2+\eta^2 \leq NA^2$ as an integration range of $\xi$ and $\eta$ and standardizes it with $\pi NA^2$ to calculate the optical transfer function (OTF). Symbols $\xi$ and $\eta$ denote exit pupil coordinates represented by a direction cosine of a ray in the optical system (image pickup optical system), and symbol NA denotes a numerical aperture of the optical system. Alternatively, as other methods of calculating the OTF, the OTF may be calculated from the pupil function $G(\xi,\eta)$ through a PSF. In this case, the Fourier transform of the pupil function $G(\xi,\eta)$ is performed to calculate a point spread function by amplification, and then an absolute value of the point spread function by amplification is squared to calculate the PSF, and further the Fourier transform of the PSF is performed to calculate the OTF.

The OTF obtained at step S502 is a so-called frequency response of the PSF of an optical aerial image, and it is a frequency response within a frequency band up to the optical cutoff frequency λ/(2NA). Therefore, in order to apply the OTF to a digital shot image in the image restoration, sampling is needed to be adapted to the frequency band depending on the size of the image pickup element (sensor size), i.e. band conversion up to the Nyquist frequency of the image pickup element needs to be performed. Since each pixel of an actual image pickup element always returns an averaged value of input light intensity distributions, it is preferred that characteristics of the pixel of the image pickup element are added to the OTF. When an optical member such as an optical low-pass filter is inserted before the image pickup element, it is preferred that its characteristics are added to the OTF.

Subsequently, at step S503, the filter generation unit 103 designs an image restoration filter (frequency space image restoration filter) to correct the deterioration of the shot image by using the OTF obtained depending on various conditions (shooting conditions). As the image restoration filter, the Wiener filter or a deformed filter of the Wiener filter can be used. In this embodiment, preferably, the filter generation unit 103 calculates the optical transfer function (OTF) based on the second optical characteristic data and it performs the band conversion on the calculated optical transfer function up to the Nyquist frequency of the image pickup element. Then, the filter generation unit 103 generates the image restoration filter based on the band-converted optical transfer function. A typical image pickup optical system has a narrow shift-invariant region in which optical characteristics are invariable for each position, and expression (1) satisfies only in the narrow region. Accordingly, it is necessary to apply the image restoration filter which changes depending on an image height position in the shot image data.

Therefore, at step S504, the filter generation unit 103 performs the frequency conversion of the frequency space image restoration filter determined at step S503 to a real space image restoration filter. Subsequently, at step S505, the filter generation unit 103 performs a convolution process of the real space image restoration filter determined at step S504 on the shot image (image on which the image restoration is to be performed). In this embodiment, it is preferred that the process is performed while switching the real space image restoration filter depending on the image height position in the shot image in order to reduce the calculation time. Therefore, the filter generation unit 103 performs the frequency conversion on the frequency space image restoration filter designed in the frequency space to the real space image restoration filter to be used. Then, at step S506, the image processing apparatus 100 outputs the restored image (corrected image corrected by the image restoration.

Embodiment 2

Next, referring to FIG. 6, an image pickup apparatus in Embodiment 2 of the present invention will be described.

Figure 6:
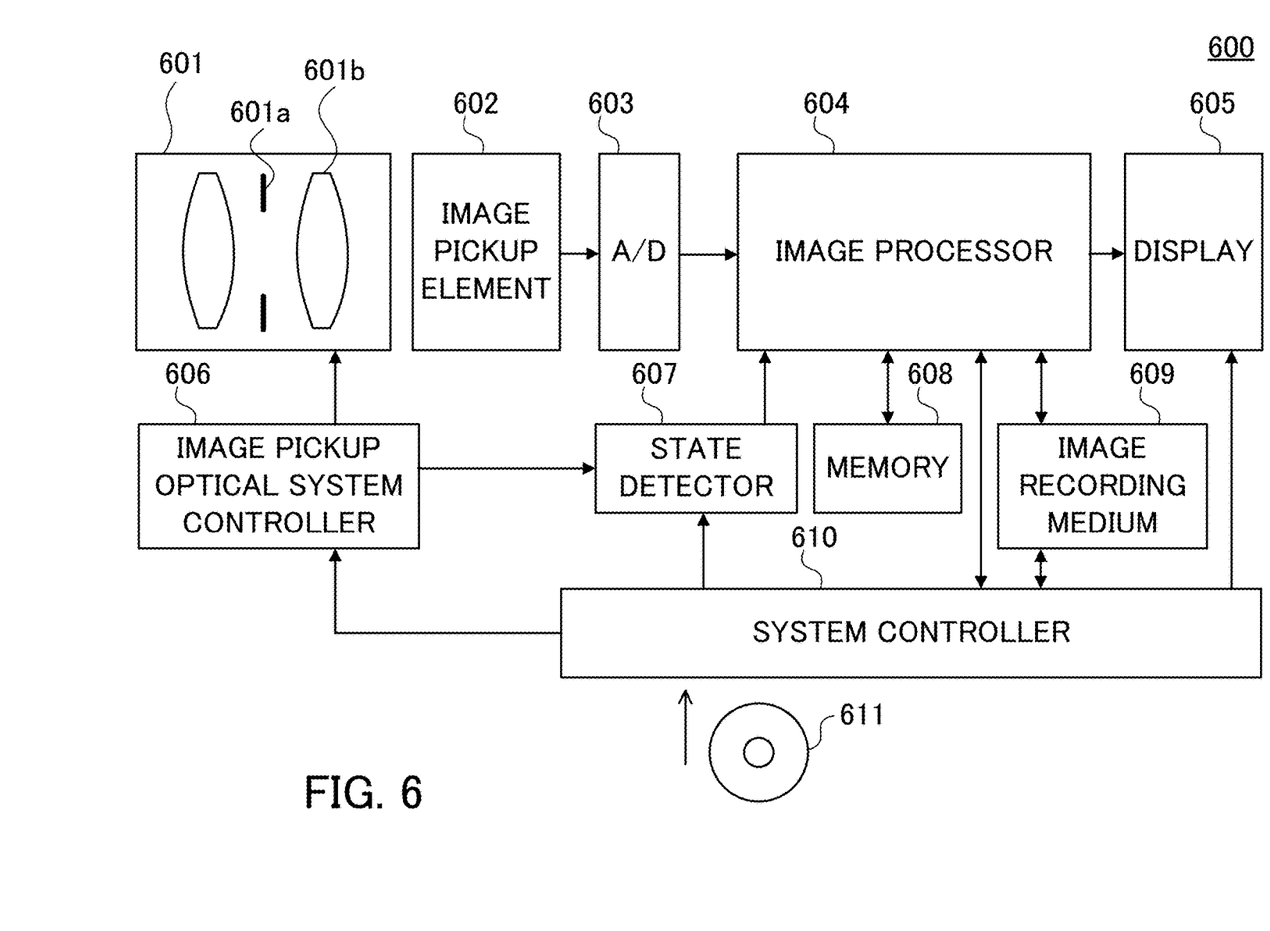
FIG. 6 is a block diagram of an image pickup apparatus in Embodiment 2.

FIG. 6 is a block diagram of an image pickup apparatus 600 in this embodiment. The image pickup apparatus 600 includes an image processor 604 (image processing apparatus) capable of performing the image processing method in Embodiment 1 described with reference to FIG. 1.

In the image pickup apparatus 600, an object (not illustrated) is imaged on an image pickup element 602 via an image pickup optical system 601 including an aperture stop 601a (or light blocking member) and a focus lens 601b. An aperture value (F number) is determined by the aperture stop 601a or the light blocking member. The image pickup element 602 photoelectrically converts an object image (optical image) formed via the image pickup optical system 601 to output an image (shot image). An electric signal output from the image pickup element 602 is output to an A/D converter 603. The A/D converter 603 converts the electric signal (analog signal) input from the image pickup element 602 to a digital signal and then outputs the digital signal (shot image data) to the image processor 604. The image pickup element 602 and the A/D converter 603 constitute an image pickup unit.

The image processor 604 corresponds to the image processing apparatus 100 in Embodiment 1, mid it performs the image restoration on the shot image and outputs the corrected image (restored image). A memory 608 (data storage unit) stores the optical characteristic data (information on the first optical characteristic data of the image pickup optical system 601 for each combination of the focal length, the F number, the shooting condition, and the image height. Similarly to Embodiment 1, the data storage unit can be provided in the image processor 604.

The image pickup unit (image pickup element 602 and A/D converter 603) converts the optical image formed via the image pickup optical system 601 to the electric signal to output the shot image. In this case, an image pickup optical system controller 606 and a state detector 607 acquire the shooting condition such as a focal length, an F number, and a shooting distance at the time of shooting the image. The image processor 604 generates the optical characteristic data (first optical characteristic data) corresponding to the acquired shooting condition, and generates the optical characteristic data (second optical characteristic data) which are obtained by combining the first optical characteristic data with the defocus characteristics. Then, the image processor 604 performs the image restoration on the shot image by using the image restoration filter generated based on the second optical characteristic data to output the restored image (corrected image).

The output image (restored image) processed by the image processor 604 is recorded in an image recording medium 609 in a predetermined format. A display 605 displays an image obtained by performing predetermined processing for display on the processed image (restored image) in this embodiment. Alternatively, the display 605 may display a simply-processed image for high-speed display. The display 605 also displays a GUI to select an image restoration mode or a normal shooting mode by the user. When the image restoration mode is selected by the user via the GUI on the display 605, a system controller 610 controls the image processor 604 to perform the image processing method described with reference to FIG. 1. The system controller 610 includes a CPU, MPU, or the like, and it controls a whole of the image pickup apparatus 600.

In this embodiment, the image pickup optical system 601 (lens apparatus) is integrated with the image pickup apparatus 600 (image pickup apparatus body), but the embodiment is not limited thereto. The image pickup optical system 601 may be an interchangeable lens removably mounted on the image pickup apparatus body such as a single-lens reflex camera.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

An image processing apparatus in each embodiment is capable of calculating and generating optical characteristic data without storing them to be used for correction for each defocus amount. According to each embodiment, an image processing apparatus, an image pickup apparatus, an image processing method, an image processing program, and a storage medium can be provided which are capable of accurately correcting a deteriorated image (shot image) containing a small displacement of a focal position in the shot image with a small amount of data.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

REFERENCE SINGS LIST

100 IMAGE PROCESSING APPARATUS
101 DATA STORAGE UNIT
102 DATA GENERATION UNIT
104 RESTORATION UNIT

The invention claimed is:
1. An image processing apparatus comprising:
a memory configured to store information on first optical characteristic data;
a data generator configured to generate previously unstored second optical characteristic data based on the first optical characteristic data related to a shot image and defocus characteristic data; and a restoration processor configured to restore the shot image based on the second optical characteristic data,
wherein the data generator is configured to combine, for each position of the shot image, the first optical characteristic data with the defocus characteristic data to generate the second optical characteristic data,
wherein the first optical characteristic data are aberration data determined depending on an image pickup optical system and a shooting condition, and
wherein the defocus characteristic data are aberration data determined depending on a defocus amount.

2. The image processing apparatus according to claim 1, wherein the aberration data determined depending on the image pickup optical system are aberration data on a focal plane.

3. The image processing apparatus according to claim 1, further comprising a defocus determiner configured to determine the defocus characteristic data.

4. The image processing apparatus according to claim 3, wherein the defocus determiner is configured to determine the defocus characteristic data based on a defocus amount of the shot image.

5. The image processing apparatus according to claim 4, wherein the defocus determiner is configured to determine the defocus characteristic data based on the defocus amount determined by distance information of the shot image.

6. The image processing apparatus according to claim 3, wherein the defocus determiner is configured to determine the defocus characteristic data based on an instruction of a user.

7. The image processing apparatus according to claim 1, further comprising a filter generator configured to generate an image restoration filter by using the second optical characteristic data,
wherein the restoration processor is configured to restore the shot image by using the image restoration filter.

8. The image processing apparatus according to claim 7, wherein the filter generator is configured to:
calculate an optical transfer function based on the second optical characteristic data,
perform band conversion on the calculated optical transfer function up to a Nyquist frequency of an image pickup element, and
generate the image restoration filter based on the band-converted optical transfer function.

9. An image pickup apparatus comprising:
an image pickup device configured to photoelectrically convert an optical image formed via an image pickup optical system to output a shot image;
a memory configured to store information on first optical characteristic data;
a data generator configured to generate previously unstored second optical characteristic data based on the first optical characteristic data related to the shot image and defocus characteristic data; and
a restoration processor configured to restore the shot image based on the second optical characteristic data,
wherein the data generator is configured to combine, for each position of the shot image, the first optical characteristic data with the defocus characteristic data to generate the second optical characteristic data,
wherein the first optical characteristic data are aberration data determined depending on an image pickup optical system and a shooting condition, and
wherein the defocus characteristic data are aberration data determined depending on a defocus amount.

10. An image processing method comprising:
generating first optical characteristic data related to a shot image based on information on the first optical characteristic data stored in a memory;
generating previously unstored second optical characteristic data based on the first optical characteristic data related to the shot image and defocus characteristic data; and
restoring the shot image based on the second optical characteristic data,
wherein the second optical characteristic data is generated by combining, for each position of the shot image, the first optical characteristic optical data with the defocus characteristic data,
wherein the first optical characteristic data are aberration data determined depending on an image pickup optical system and a shooting condition, and
wherein the defocus characteristic data are aberration data determined depending on a defocus amount.

11. A non-transitory computer-readable storage medium which stores an image processing program causing a computer to execute a process comprising:
generating first optical characteristic data related to a shot image based on information on the first optical characteristic data stored in a memory;
generating previously unstored second optical characteristic data based on the first optical characteristic data related to the shot image and defocus characteristic data; and
restoring the shot image based on the second optical characteristic data,
wherein the first optical characteristic data are aberration data determined depending on an image pickup optical system and a shooting condition, and
wherein the defocus characteristic data are aberration data determined depending on a defocus amount.

12. An image processing apparatus comprising:
a memory storing information on first optical characteristic data; and
a processor configured to perform functions of a data generation unit and a restoration unit based on the first optical characteristic data stored in the memory,
wherein the data generation unit is configured to generate previously unstored second optical characteristic data based on the first optical characteristic data related to a shot image and defocus characteristic data,
wherein the restoration unit is configured to restore the shot image based on the second optical characteristic data, and
wherein the data generation unit is configured to combine, for each position of the shot image, the first optical characteristic data with the defocus characteristic data to generate the second optical characteristic data,
wherein the first optical characteristic data are aberration data determined depending on an image pickup optical system and a shooting condition, and
wherein the defocus characteristic data are aberration data determined depending on a defocus amount.

* * * * *